United States Patent
Zhao

(10) Patent No.: US 11,074,306 B2
(45) Date of Patent: Jul. 27, 2021

(54) WEB CONTENT EXTRACTION METHOD, DEVICE, STORAGE MEDIUM

(71) Applicant: Tencent Technology (Shenzhen) Company Limited, Guandong (CN)

(72) Inventor: Mingxin Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 253 days.

(21) Appl. No.: 16/359,224

(22) Filed: Mar. 20, 2019

(65) Prior Publication Data

US 2019/0220488 A1 Jul. 18, 2019

Related U.S. Application Data

(63) Continuation of application No. PCT/CN2017/112866, filed on Nov. 24, 2017.

(30) Foreign Application Priority Data

Dec. 9, 2016 (CN) .......................... 201611126527.4
Dec. 16, 2016 (CN) .......................... 201611170430.3

(51) Int. Cl.
*G06F 16/951* (2019.01)
*G06F 16/958* (2019.01)
(Continued)

(52) U.S. Cl.
CPC .......... *G06F 16/951* (2019.01); *G06F 16/953* (2019.01); *G06F 16/958* (2019.01); *G06N 20/00* (2019.01)

(58) Field of Classification Search
CPC .... G06F 16/953; G06F 26/951; G06F 16/958; G06F 16/951; G06N 20/00
See application file for complete search history.

(56) References Cited

U.S. PATENT DOCUMENTS 9,274,693 B2 3/2016 Moore et al.
10,346,257 B2 * 7/2019 Jiang ................... G06F 11/1453
(Continued)

FOREIGN PATENT DOCUMENTS

CN 101515272 A 8/2009
CN 102768663 A 11/2012
(Continued)

OTHER PUBLICATIONS

Chen, Yi, "Research and Application of the Web Information Extraction Based on Multi-feature," Full-text Database of Chinese Outstanding Master Dissertation, Information and Technology, vol. 7, Jul. 15, 2016, 72 pages.

(Continued)

*Primary Examiner* — Etienne P Leroux
(74) *Attorney, Agent, or Firm* — Brinks Gilson & Lione

(57) ABSTRACT

A system may determine a plurality of candidate regions in a web page, each candidate region comprising one or more page elements at neighboring positions in the web page. The system may extract, for each of the plurality of candidate regions, extraction values corresponding to a plurality of visual features in the candidate regions, the visual features being perceptible to human eyes, and the extraction values derived from attribute values respectively defined by the web page for the visual features. The system may select, from the plurality of candidate regions, a target region that satisfies an extraction criteria based on the extraction values corresponding to the visual features. The system may extract content information of the target region.

15 Claims, 12 Drawing Sheets

(51) Int. Cl.
*G06F 16/953* (2019.01)
*G06N 20/00* (2019.01)

(56) References Cited

U.S. PATENT DOCUMENTS

| | | | |
|---|---|---|---|
| 2005/0066269 A1 | 3/2005 | Wang et al. | |
| 2010/0132026 A1* | 5/2010 | Ferlitsch | G06F 21/6227 726/11 |
| 2016/0026902 A1* | 1/2016 | Mitsuhashi | H04N 1/46 358/1.9 |

FOREIGN PATENT DOCUMENTS

| | | |
|---|---|---|
| CN | 103488746 A | 1/2014 |
| CN | 103870486 A | 6/2014 |
| CN | 104346405 A | 2/2015 |
| CN | 105631008 A | 6/2016 |

OTHER PUBLICATIONS

Office Action dated Sep. 3, 2019 for Chinese Application No. 201611126527.4 with concise English Translation, 12 pages.
English translation of International Search Report issued in PCT/CN2017/112866, dated Feb. 24, 2018, pp. 1-2, State Intellectual Property of the P.R. China, Beijing, China.

\* cited by examiner

WEB CONTENT EXTRACTION METHOD, DEVICE, STORAGE MEDIUM

CROSS REFERENCE TO RELATED APPLICATIONS

The system is a continuation of International Application PCT/CN2017/112866, filed Nov. 24, 2017, which claims priority to Chinese Patent Application No. 201611126527.4, filed with the Chinese Patent Office on Dec. 9, 2016 and entitled "METHOD AND APPARATUS FOR EXTRACTING WEB PAGE CONTENT", and to Chinese Patent Application No. 201611170430.3, filed with the Chinese Patent Office on Dec. 16, 2016 and entitled "METHOD AND APPARATUS FOR RECOGNIZING WEB PAGE CONTENT, AND SERVER", all of which are incorporated herein by reference in their entirety.

TECHNICAL FIELD

Embodiments of the system relates to the field of computer technologies, and specifically, to system and methods for extracting web page content.

BACKGROUND

As the scale of the Internet constantly increases, network information exponentially grows. A network service provider can extract content in web pages and store the content in a database, thereby providing a querying service for the user.

SUMMARY

In view of this, embodiments of the system provide a system, method, and apparatus for extracting web page content. By way of example, a network device may determine a plurality of candidate regions in a web page. Each candidate region may include one or more page elements at neighboring positions in the web page. The network device may extract, for each of the plurality of candidate regions, extraction values of a plurality of visual features of the candidate region. The network device may determine, in the plurality of candidate regions according to the extraction values of the plurality of visual features, a target region that satisfies an extraction criteria. The network device may extract content information of the target region. Additional or alternative examples, embodiments, and improvements are disclosed herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Systems and methods for web-page content extraction are provided herein. While various embodiments have been described, it will be apparent to those of ordinary skill in the art that many more embodiments and implementations are possible. Accordingly, the embodiments described herein are examples, not the only possible embodiments and implementations.

By way of introductory example, a system may determine a plurality of candidate regions in a web page, each candidate region comprising one or more page elements at neighboring positions in the web page. The system may extract, for each of the plurality of candidate regions, extraction values corresponding to a plurality of visual features in the candidate regions, the visual features being perceptible to human eyes, and the extraction values derived from attribute values respectively defined by the web page for the visual features. The system may select, from the plurality of candidate regions, a target region that satisfies an extraction criteria based on the extraction values corresponding to the visual features. The system may extract content information of the target region. The system and methods described herein may efficiently utilize computing resources and conserve human resources involved in identifying and extracting web context. Alternately or in addition, the systems and methods described herein may extract target content from a web page with increased accuracy and relevance based on the visual features of the web page.

Figure 1:
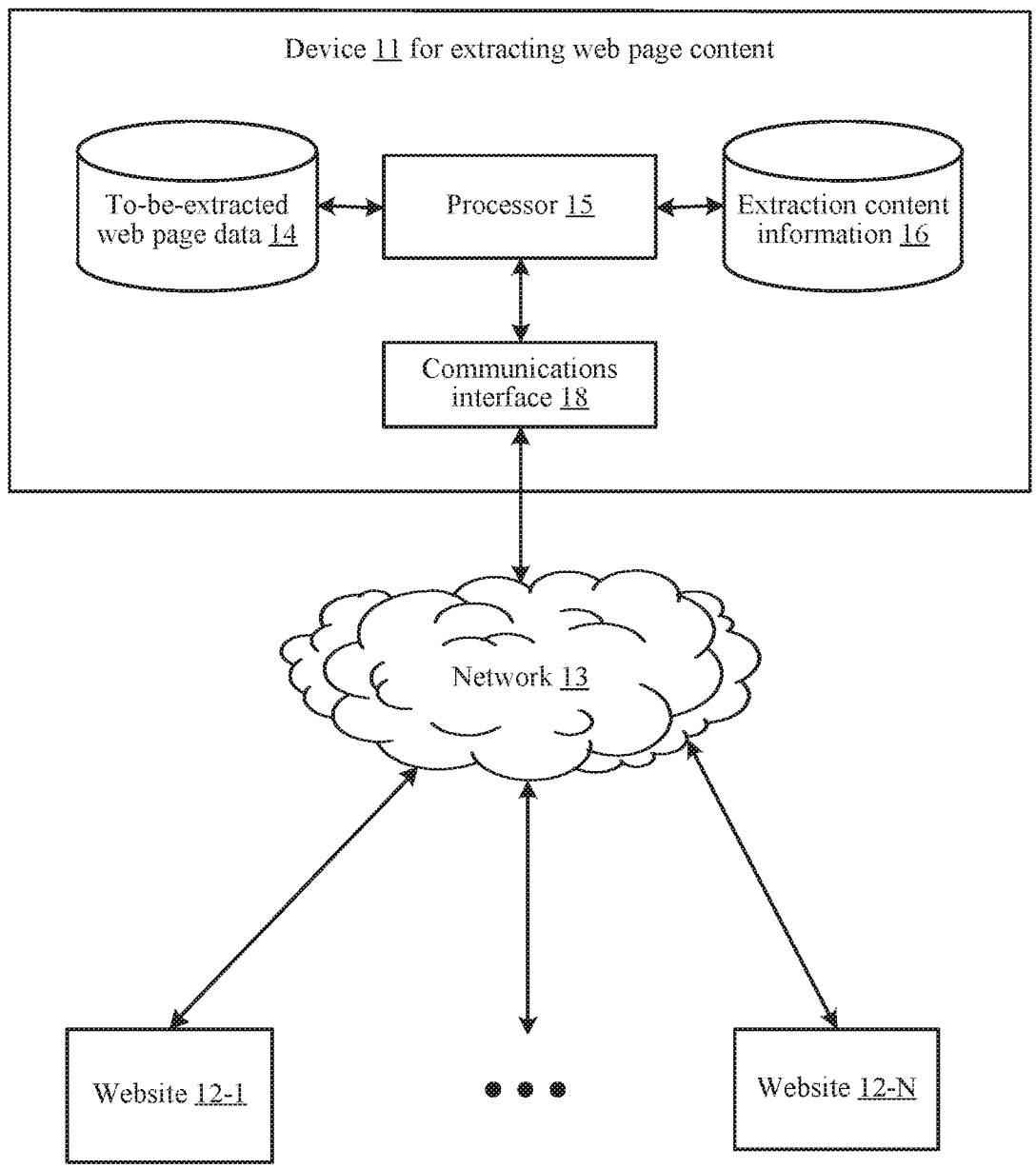
FIG. 1 is a schematic diagram of a network scenario of logic for extracting web page content according to an embodiment of the system.

FIG. 1 is a schematic diagram of a system for extracting web page content according to an embodiment of the system. As shown in FIG. 1, a system 10 may include a device 11 for extracting web page content, a plurality of websites 12-1 to 12-N, and a network 13. The device 11 for extracting web page content may obtain web page data (hereinafter referred to as a web page) from a plurality of websites through the network 13, and extract target content information in each web page according to the logic in each embodiment.

The device 11 for extracting web page content may include a processor 15, a communications interface 18, a to-be-extracted web page data storage apparatus 14, and an extraction content information storage apparatus 16.

The processor 15 may be a dedicated processor (such as an FPGA or ASIC), a general purpose processor, or another programmable processor. The processor 15 may extract the target content information in the web page by executing embedded processing logic or a computer-readable instruction stored in a memory.

The device 11 for extracting web page content may obtain the web page data from each website by using the communications interface 18, and store the obtained web page data in the to-be-extracted web page data storage apparatus 14. The target content information extracted by the processor 15 may be stored in the extraction content information storage apparatus 16 for use by another service processing device. For example, a search engine can search content information matching a search term of a user in the content information storage apparatus 16; and an application server can query the content information storage apparatus 16 for content information matching a tag of the user and provide the content information for the user.

Figure 2:
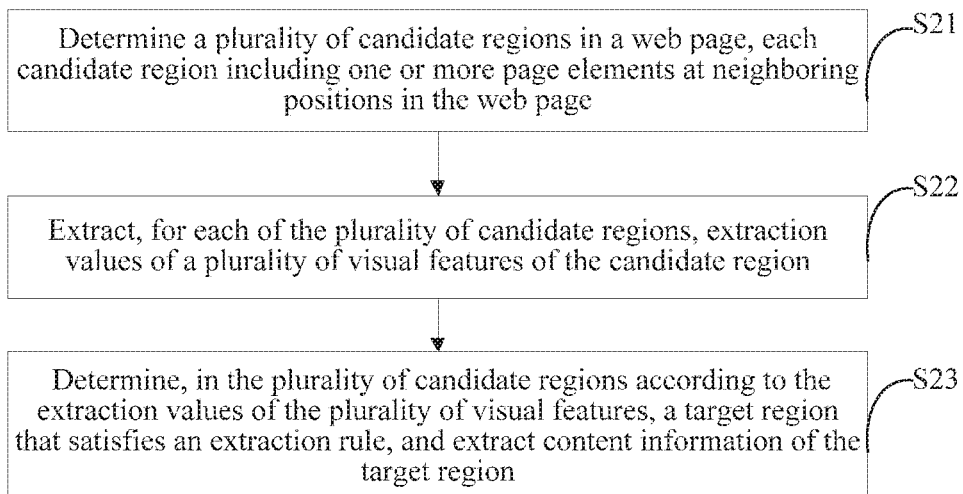
FIG. 2 is a flowchart of logic for extracting web page content according to an embodiment of the system.

FIG. 2 is a schematic flowchart of logic for extracting web page content according to an embodiment of the system. As shown in FIG. 2, the logic 20 may include the following operations. At operation S21, the logic may determine a plurality of candidate regions in a web page, each candidate region including one or more page elements at neighboring positions in the web page. At operation S22, the logic may extract, for each of the plurality of candidate regions, extraction values of a plurality of visual features of the candidate region. At operation S23, the logic may determine, in the plurality of candidate regions according to the extraction values of the plurality of visual features, a target region that satisfies an extraction criteria, and extract content information of the target region.

The visual feature is a feature in the web page that is perceptible to human eyes, for example, a font, a color, a size, a bold degree, a color of a background, or a color of a frame of text, a color of a foreground, a color of a background, or a size of an image, or a position of a page element. The extraction value of the visual feature is a value of the visual feature that is extracted from web page data and that is set in data of the web page. The extraction value may be a value of a numerical type or a non-numerical type. The value of a numerical type is a value represented by a number, for example, a size of a font, a thickness and weight of a line, a size and position of a picture. The value of a non-numerical type is generally selected from a set including a plurality of pieces of description information. For example, a font, and whether a bold, italic, or frame-adding operation is performed. In some embodiments, when values of a visual feature of a plurality of page elements in the candidate region are different, values of a plurality of visual features may be processed by using a preset rule, to obtain the values of the visual feature of the candidate region. For example, a value may be selected from the values of the visual feature of the plurality of page elements according to a predetermined rule as an extraction value of the visual feature in the candidate region. For another example, calculation may be performed on the plurality of values according to a predetermined algorithm (such as averaging and weighted averaging), and a calculation result is used as the extraction value of the visual feature in the candidate region.

The candidate region is a region in which target content may exist in the web page. In some embodiments, all regions in the web page may be used as the candidate region. For example, composition blocks of the web page may be used as a candidate region according to a structure of the web page. For another example, when web page elements are organized in a tree structure, all nodes at a level or all nodes of each level of the tree structure may be used as the candidate region. In some embodiments, regions extracted from the web page may be filtered according to the preset rule, and a region obtained after filtering are used as the candidate region. For example, a region located in a preset position range in the web page may be determined as the candidate region. The position range may be determined according to positions of target regions marked in a plurality of web page samples. For another example, a region including a preset content tag in the web page may be determined as the candidate region. For example, when the target content includes a picture, an html tag of the picture in the web page data is "img", so that a region including the "img" tag in the web page is determined as the candidate region. For example, the web page includes a plurality of chunks. When the preset content tag is "img", a chunk including the html tag "img" in the plurality of chunks is used as the target region. The foregoing is merely several examples, and other embodiments may use another filtering manner as needed.

A hypertext markup language (HTML) tag of the web page element in the web page is in quite strong association with the web page element. For example, generally, an HTML tag of a picture is img. Therefore, for the target content which is a picture, an HTML tag img may be added to a preset visual feature of the target content. For a priority value of a feature of the HTML tag in the candidate region and a calculation process of the priority value, refer to a calculation process of a priority value of another visual feature, and details are not further described herein.

Each candidate region may include one or more page elements at the neighboring positions in the web page. The page element forms the smallest unit of the web page. For example, an item of content corresponding to an html tag may be used as a page element.

The target region is a region of the target content, the target content being to-be-extracted content determined by using the logic in the embodiments of the system. Content information extracted from the target region is information of the target content. In some embodiments, the extracted content information may be content or a path of the content, for example, an extensible markup language path language (XPath), or a JavaScript Object Notation-path (JSON-Path).

According to the embodiments of the system, to attract a user, a website operator usually sets key content very conspicuous by using, for example, a bright color or a relatively larger font. A machine is used to recognize and extract the target content by using these visual features. This is labor-saving and time-saving, and accuracy of content extraction is improved.

In this embodiment of the system, the target region may be determined according to the extraction value of the visual feature by using various logic. For example, value ranges of visual features of the target content may be collected, and the target region is determined according to these value ranges.

For another example, a machine learning algorithm may be trained by using a marked web page sample, and the target region is recognized by using the trained machine learning algorithm, to complete extraction of target content information.

In some embodiments, the value ranges of the visual features of the target content may be collected, and the target region is determined according to these value ranges.

Figure 3:
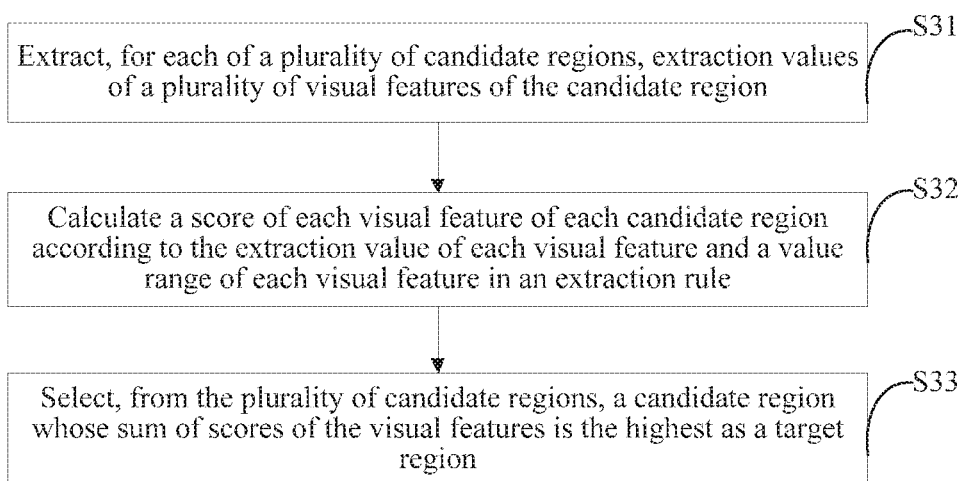
FIG. 3 is a flowchart of logic for extracting web page content according to an embodiment of the system.

FIG. 3 is a flowchart of logic for extracting web page content according to an embodiment of the system. For brief description, steps in the embodiments similar to the operations described above are omitted. As shown in FIG. 3, the logic 30 may include the following steps.

At operation S31, the logic may extract, for each of a plurality of candidate regions, extraction values of a plurality of visual features of the candidate region. At operation S32, the logic may calculate a priority value of each visual feature of each candidate region according to the extraction value of each visual feature and a value range of each visual feature in an extraction criteria. At operation S33, the logic may select, from the plurality of candidate regions, a candidate region whose sum of priority values of the visual features is the highest as a target region.

In some embodiments, the priority value of the visual feature may indicate a matching degree between the extraction value of the visual feature and the value range of the visual feature by the extraction criteria. For example, the extraction criteria may include a priority value rule, in other words, different parts in the value range correspond to different priority values. In some embodiments, the priority value of the visual feature may indicate an importance degree of the visual feature in all visual features. For example, an uppermost visual feature of target content may correspond to a higher upper value limit, and a secondary visual feature may correspond to a lower upper value limit. For example, when a upper value limit of a size of a font is greater than a upper value limit of a color of the font, it indicates that impact of the color of the font on determining of the target region is less than impact of the size of the font. The following provides an example of logic for generating the extraction criteria.

Figure 4:
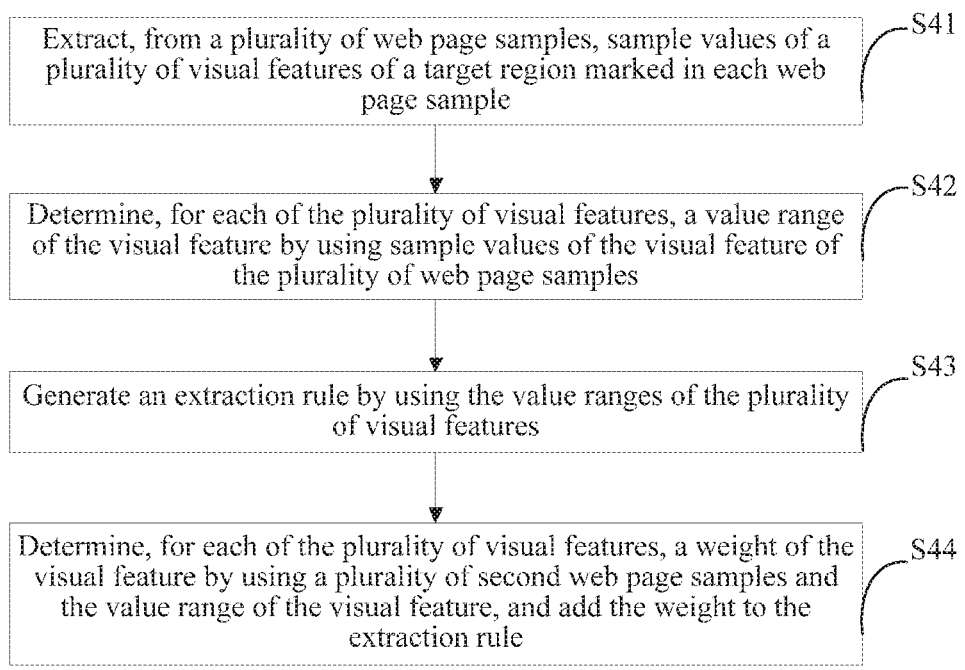
FIG. 4 is a flowchart of logic for generating an extraction criteria according to an embodiment of the system.

FIG. 4 is a flowchart of logic for generating an extraction criteria according to an embodiment of the system. As shown in FIG. 4, the logic 40 may include the following operations.

At operation S41, the logic may extract, from a plurality of web page samples, sample values of a plurality of visual features of a target region marked in each web page sample. The web page sample is a pre-extracted web page in which target content is manually marked and from which the value range of the visual feature of the target content is extracted. The sample value of the visual feature is a value of the visual feature of the target content in the web page sample.

At operation S42, the logic may determine, for each of the plurality of visual features, a value range of the visual feature by using sample values of the visual feature of the plurality of web page samples. For a numeric sample value, the value range may be one or more numeric ranges. For a non-numeric sample value, the value range may be a discrete set that includes various possible values. The non-numeric sample value may alternatively be converted into a value by using a word vector, and the value range may be in an array manner.

At operation S43, the logic may generate the extraction criteria by using the value ranges of the plurality of visual features. The generated extraction criteria may include the value range of each visual feature obtained in step S42. In some embodiments, to determine impact of each visual feature on recognition accuracy of the target content, an upper value limit of each visual feature may be set. For example, the logic 40 may further include the following.

Step S44: Determine, for each of the plurality of visual features, a weight of the visual feature by using a plurality of second web page samples and the value range of the visual feature, and add the weight to the extraction criteria. During calculating a priority value of each visual feature of each candidate region, a priority value of the first visual feature of the first candidate region is set as a weight of the first visual feature by the extraction criteria when an extraction value of a first visual feature a candidate region falls within a value range of the first visual feature by the extraction criteria.

Herein, the weight of the visual feature may be used for calculating an upper value limit of the visual feature. The upper value limit indicates impact of the visual feature on recognition accuracy of the target content. In some embodiments, the weight may be directly used as the upper value limit of the visual feature.

Figure 5:
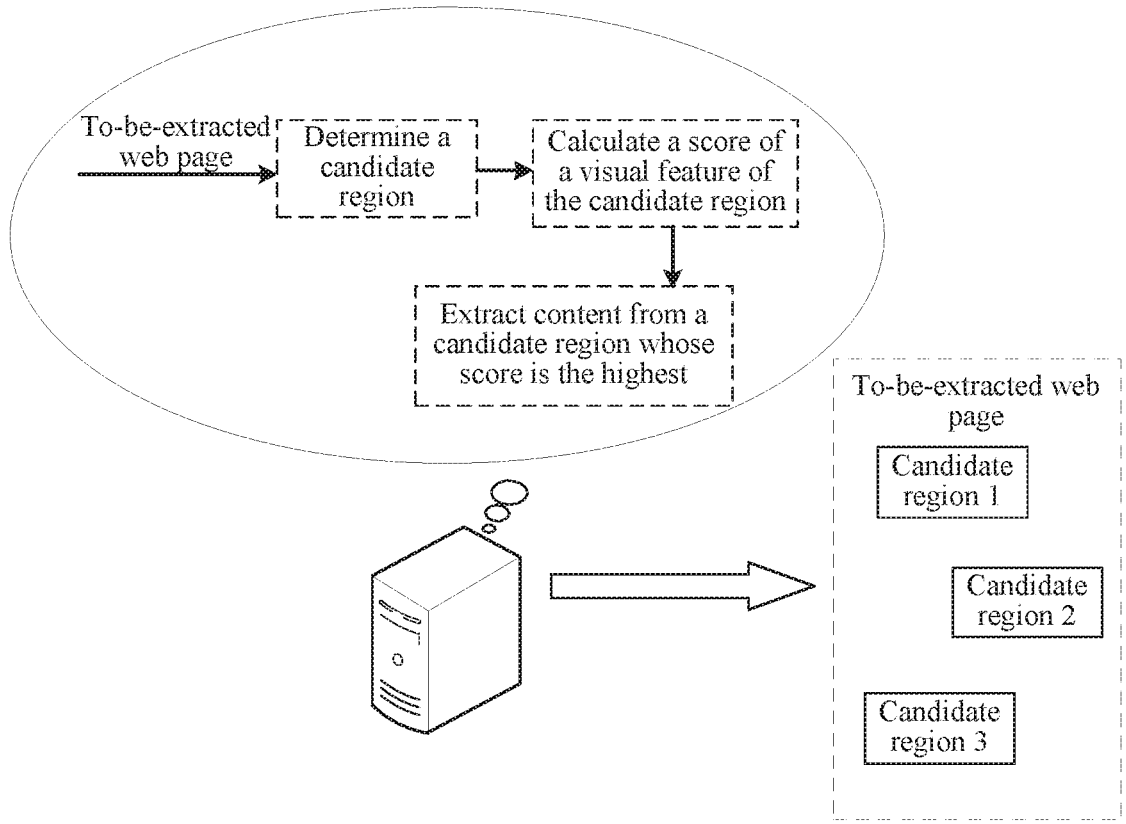
FIG. 5 is a schematic diagram of an application scenario of logic for extracting web page content according to an embodiment of the system.

FIG. 5 is a schematic diagram of an application scenario 50 of logic for extracting web page content according to an embodiment of the system. As shown in FIG. 5, an apparatus for extracting web page content may first download a to-be-extracted web page, and then determine a candidate region of target content in the to-be-extracted web page. There may be a plurality of candidate regions. A priority value of a visual feature of each candidate region is calculated according to a preset visual feature of the target content, and the target content is extracted from a candidate region whose priority value of the visual features is the highest. The target content is web page content that needs to be extracted, for example, a title, a picture, or a price in the web page. The preset visual feature may be user-attractive and outstanding design made, for the target content, by a web page designer according to experience of obtaining web page information by using human eyes. The preset visual feature may be information such as a color of a font, a size of the font, a bold degree of the font, a color of a background, or a color of a frame of the target content.

For example, in the to-be-extracted web page shown in FIG. 5, it can be learned according to statistics that there are three candidate regions of the target content. Priority values of a visual feature of the three candidate regions are calculated, and a candidate region whose priority value of the visual features is the highest is selected. For example, if the candidate region whose priority value of the visual features is the highest is a candidate region 2, the target content is extracted from the candidate region 2. To be specific, an extraction process in this embodiment of the system determines a region of the target content depending on the preset visual feature of collected target content, thereby directly extracting the target content from the region without manually marking XPath data of each web page. This saves human resources and improves extraction efficiency.

Figure 6:
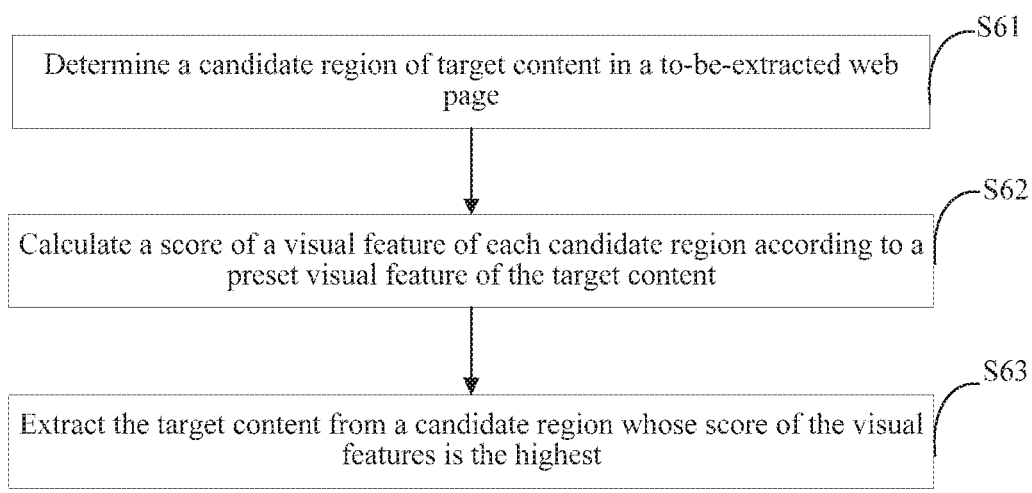
FIG. 6 is a flowchart of logic for extracting web page content according to an embodiment of the system.

FIG. 6 is a flowchart of logic for extracting web page content according to an embodiment of the system. As shown in FIG. 6, the logic 60 may include the following operations.

At operation S61, the logic may determine a candidate region of target content in a to-be-extracted web page. The target content belongs to to-be-extracted content. A type of the to-be-extracted web page may be first determined, and a set of regions of to-be-extracted content of collected web pages of a corresponding type in the web page is searched according to the type of the to-be-extracted web page. The candidate region of the target content in the to-be-extracted web page is determined according to the set. Each type of web page usually includes a plurality of web pages. Different web pages may have different structures and layouts, so that there are usually a plurality of candidate regions.

At operation S62, the logic may calculate a priority value of a visual feature of each candidate region according to a preset visual feature of the target content. During specific implementation, the preset visual feature of the target content may be obtained according to preset visual features of to-be-recognized content. The priority value of the visual feature of each candidate region is calculated according to the preset visual feature of the target content. For example, first, a priority value of each visual feature corresponding to each preset visual feature of the target content and existing in each candidate region is calculated. For example, whether each visual feature in each candidate region matches each preset visual feature of corresponding target content may be determined. For example, it may be determined that a priority value of a visual feature matching the corresponding preset visual feature is equal to a preset priority value of the preset visual feature; and it is determined that a priority value of a visual feature failing to match the corresponding preset visual feature is equal to zero.

The foregoing matching includes: the visual feature is the same as the corresponding preset visual feature, or a parameter of the visual feature falls within a parameter range of the corresponding preset visual feature. During actual application, a specific matching determining method needs to be determined in consideration of a specific visual feature. For example, for a visual feature that cannot be distinguished by using values, for example, visual features such as a color of a font, a color of a frame, and a bold font, it needs to be determined whether the visual feature is the same as the corresponding preset visual feature. For a visual feature that can be distinguished by using values, for example, a size of a font, it needs to be determined whether a parameter of the visual feature falls within the parameter range of the corresponding preset visual feature.

Subsequently, priority values of the visual features of each candidate region are accumulated to be used as a priority value of the visual features of each candidate region.

For calculation of the priority value of the visual features of each candidate region, the following describes by way of example. For example, if the target content is a price, the preset visual features of the target content are as follows: a size of a font is 18 px to 22 px, and a color of the font is red. It is confirmed by the foregoing steps that the candidate regions of the target content include a first candidate region and a second candidate region. In the first candidate region, the visual features corresponding to the preset visual features of the target content are respectively as follows: a size of a font is 20 px, and a color of the font is red. A visual feature of which the size of the font is 20 px, falls within a parameter range of the corresponding preset visual feature of which the size of the font is 18 px to 22 px (a corresponding preset value is 3), so that the visual feature matches the corresponding preset visual feature, and a priority value of the visual feature of which the size of the font is 20 px is 3. A visual feature of which the color of the font is red is the same as the corresponding preset visual feature of which the color of the font is red (a corresponding preset value is 7), so that the visual feature matches the corresponding preset visual feature, and a priority value of the visual feature of which the color of the font is red is 7. In this way, a priority value of the visual features of the first candidate region is 3+7, that is, 10. In the second candidate region, the visual features corresponding to the preset visual features of the target content are respectively as follows: a size of a font is 21 px, and a color of the font is black. A visual feature of which the size of the font is 21 px, falls within a parameter range of the corresponding preset visual feature of which the size of the font is 18 px to 22 px (a corresponding preset value is 3), so that the visual feature matches the corresponding preset visual feature, and a priority value of the visual feature of which the size of the font is 21 px is 3. A visual feature of which the color of the font is black is different from the corresponding preset visual feature of which the color of the font is red (a corresponding preset value is 7), so that the visual feature does not match the corresponding preset visual feature, and a priority value of the visual feature of which the color of the font is black is 0. In this way, a priority value of the visual features of the first candidate region is 3+0, that is, 3.

At operation S63, the logic may extract the target content from a candidate region whose priority value of the visual features is the highest.

In this embodiment, the candidate region whose priority value of the visual features is the highest is the determined region of the target content, so that the target content can be directly extracted from the candidate region whose priority value of the visual features is the highest. To be specific, in the foregoing example, the target content is extracted from the second candidate region.

In each embodiment, before the foregoing logic and method is performed, preset visual features of to-be-extracted content and preset priority values of the preset visual features may be first obtained through feature training. The preset visual feature is usually user-attractive and outstanding design made, for the to-be-extracted content, by a web page designer according to experience of obtaining web page information by using human eyes. The preset visual feature may be information such as a color of a font, a size of the font, a bold degree of the font, a color of a background, or a color of a frame of the to-be-extracted content. For example, for an e-commerce web page, generally, it is very easy for a user to find information (that is, to-be-extracted information) such as a name, a price, and a picture of merchandise. When a web page designer designs a web page, important information (for example, information such as the name, the price, and the picture of the merchandise) is designed to be more user-attractive and outstanding by the web page designer according to experience of obtaining web page information by using human eyes (that is, susceptibility of a visual perception of a human to an information feature). For example, for the price of the merchandise, a font of the price is designed to be very large, a color of the font of the price is designed to be more conspicuous, and the font of the price is even bold.

For example, various types of web pages may be first downloaded (for example, by using webkit). For each type of web page, visual features of all blocks in each web page are rendered, and visual features perceptible to human eyes are saved. These visual features include but are not limited to a color of a font, a size of the font, a bold degree of the font, a color of a background, a color of a frame, and the like. Subsequently, for each type of visual feature, feature collection is performed by using a positive example, to obtain a preset visual feature of to-be-extracted content. For example, for a visual feature of the size of the font of the price of the merchandise, based on collection, the size of the font of the price of the merchandise is usually from 18 px to 22 px, so that the preset visual feature corresponding to the size of the font of the price of the merchandise may be set as follows: the size of the font is 18 px to 22 px. For another example, for a visual feature of the color of the font of the price of the merchandise, based on collection, the color of the font of the price of the merchandise is usually red, so that the preset visual feature corresponding to the color of the font of the price of the merchandise may be set as follows: the color of the font is red.

A priority value (that is, a preset priority value) is then set for each preset visual feature. A specific value of the priority value may be determined based on recognition contribution of a corresponding preset visual feature to the to-be-recognized content. During initialization, contribution may be determined based on experience. For example, it can be learned through collection by using experience that for to-be-recognized content such as the price of the merchandise, contribution of the size of the font of the price to recognizing the price of the merchandise is 30%, and contribution of the color of the font of the price to recognizing the price of the merchandise is 70%, so that a preset value of a preset visual feature corresponding to the size of the font of the price of the merchandise may be set to 3; and a preset value of a preset visual feature corresponding to the color of the font of the price of the merchandise may be set to 7. It should be noted that this is merely an example herein, and does not constitute a limitation to specific implementation.

In some embodiments, a set of regions of the to-be-extracted content in the web page may be collected by manually collecting data. The to-be-extracted content may be user-defined according to an actual type of the web page. For example, for an e-commerce web page, the to-be-extracted content may be information such as a name, a price, and a picture of merchandise. For another example, for a news web page, the to-be-extracted content may be information such as a title and a picture. First, web pages of each site are collected (to be used as web page samples). In this embodiment, a preset quantity of typical web pages are selected from each site. The preset quantity may be user-defined according to an actual requirement. Visual feature rendering is performed on the collected web pages for convenience of browsing. The collected web pages are classified (for example, an e-commerce type or a news type). For each type of web page, position information of the to-be-extracted content in different web pages may be collected. The position information may be represented by using a combination of coordinates, a width, and a height. The position information is usually represented as a region. The position information of the to-be-extracted content in each web page is combined, and finally, a set of regions of the to-be-extracted content in each web page is formed. A set of regions of the to-be-extracted content in the web page collected for each type of web page may be obtained by analogy.

In some other embodiments, web page marking work may be assisted by a machine, and a sample value of a visual feature of a marked target region is automatically extracted by using the machine. For example, a marking device (for example, a computer on which a marking application program runs or a dedicated device) downloads web page data of a web page sample and displays the web page. In addition, the marking device may provide an operation interface on a user interface to receive an instruction for selecting the target region in the web page. The marking device records information such as an XPath of the target region in response to the instruction for selecting the target region. For a web page that has marked the target region, the marking device may extract a sample value of each visual feature of the target region from the web page data by using the recorded information of the target region. In some embodiments, the marking device may further obtain a value range of each visual feature of the target content by using the extracted sample value of each visual feature of each web page sample.

In some embodiments, after the target content is extracted, it may be tested whether the extracted target content is accurate. If the target content is accurate, a preset priority value of each preset visual feature of the target content remains unchanged; or if the target content is inaccurate, a preset priority value of each preset visual feature of the target content may be adjusted. During adjustment, several other preset values may first remain unchanged and only one preset value is adjusted, to optimize a result. This is performed by analogy, and finally, each preset value is an optimal result. For example, when the target content is a title, the preset visual features include: a size of a font is 20 px to 24 px, and the font is bold. During initialization, a preset priority value of a preset visual feature of which the size of the font is 20 px to 24 px is 6, and a preset priority value of a preset visual feature of which the font is bold is 4. During adjustment, the preset priority value of the preset visual feature of which the font is bold may remain unchanged, and the preset priority value of the preset visual feature of which the size of the font is 20 px to 24 px is adjusted to be higher or lower. Impact on a success rate of extracting the title is collected when the preset priority value of the preset visual feature of which the size of the font is 20 px to 24 px is adjusted to be higher or lower. If the success rate of extracting the title is increased when the preset priority value of the preset visual feature of which the size of the font is 20 px to 24 px is adjusted to be higher, the preset priority value of the preset visual feature of which the size of the font is 20 px to 24 px is adjusted to be higher; otherwise, if the success rate of extracting the title is decreased after the preset priority value is adjusted to be higher, an initially-set priority value first remains unchanged, and the preset priority value of the preset visual feature of which the font is bold is adjusted.

In this embodiment, the candidate regions of the target content in the to-be-extracted web page are first determined, the priority values of visual features of the candidate regions are then calculated according to the preset visual features of the target content, and the target content is finally extracted from a candidate region whose priority value of the visual features is the highest. This is the extraction process of this embodiment. The region of the target content is determined depending on user-attractive and outstanding design (that is, the preset visual feature of the target content) made by a web page designer for the target content according to experience of obtaining web page information by using human eyes, thereby directly extracting the target content from the region without manually marking XPath data of each web page. This saves human resources and improves extraction efficiency.

Figure 7:
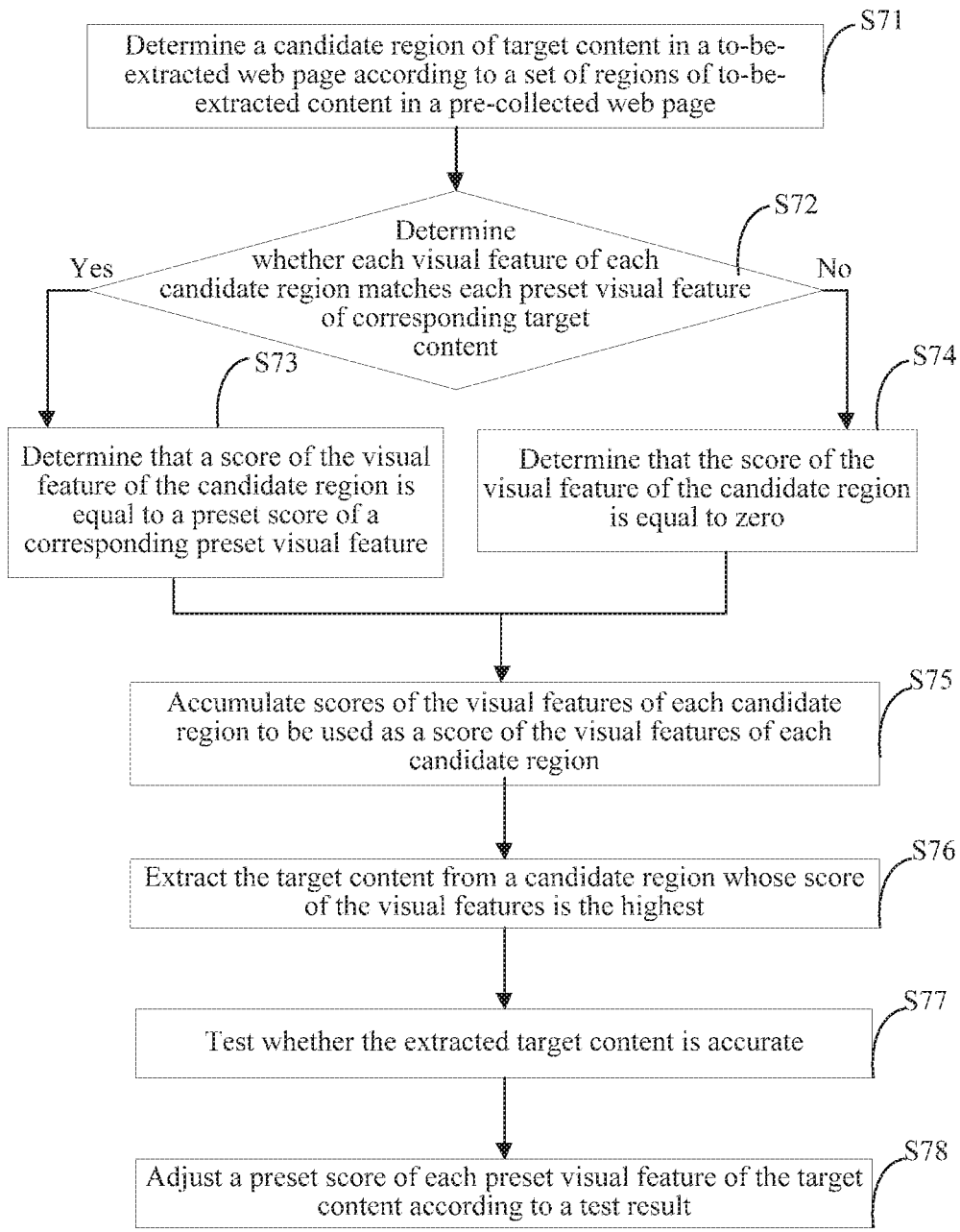
FIG. 7 is a flowchart of logic for extracting web page content according to an embodiment of the system.

FIG. 7 is a flowchart of a logic for extracting web page content according to an embodiment of the system. As shown in FIG. 7, the logic 70 may include the following operations.

At operation S71, the logic may determine a candidate region of target content in a to-be-extracted web page according to a set of regions of to-be-extracted content in a pre-collected web page.

At operation S72, the logic may determine whether each visual feature of each candidate region matches each preset visual feature of corresponding target content. When a visual feature correspondingly matches the preset visual feature, step S73 is performed, and when a visual feature does not correspondingly match the preset visual feature, step S74 is performed.

At operation S73, the logic may determine that a priority value of the visual feature of the candidate region is equal to a preset priority value of a corresponding preset visual feature. At operation S74, the logic may determine that the priority value of the visual feature of the candidate region is equal to zero. During specific implementation, the preset visual feature of the target content is obtained according to a preset visual feature corresponding to each piece of to-be-recognized content obtained through training. The priority value of the visual feature of each candidate region is calculated according to the preset visual feature of the target content.

At operation S75, the logic may accumulate priority values of the visual features of each candidate region to be used as a priority value of the visual features of each candidate region.

At operation S76, the logic may extract the target content from a candidate region whose priority value of the visual features is the highest. At operation S77, the logic may test whether the extracted target content is accurate. At operation S78, the logic may adjust a preset priority value of each preset visual feature of the target content according to a test result.

Figure 8:
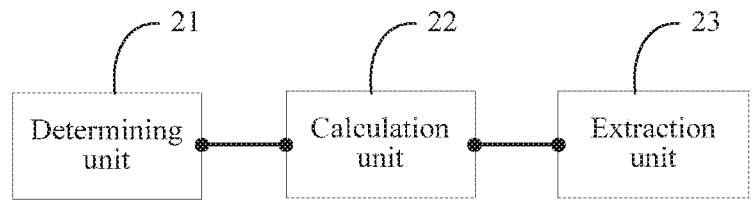
FIG. 8 is a schematic diagram of an apparatus for extracting web page content according to an embodiment of the system.

FIG. 8 is a schematic diagram of an apparatus for extracting web page content according to an embodiment of the system. The apparatus 80 may be disposed in a device 11 for extracting web page content. For example, the apparatus 80 is stored in a memory of the device 11 for extracting web page content in a manner of a computer-readable instruction. The apparatus 80 for extracting web page content may include a determining unit 21, a calculation unit 22, and an extraction unit 23.

The determining unit 21 may determine a candidate region of the target content in the to-be-extracted web page.

The calculation unit 22 may calculate the priority value of the visual feature of each candidate region according to the preset visual feature of the target content.

In some embodiments, the calculation unit 22 may obtain the preset visual feature of the target content according to the preset visual feature corresponding to the to-be-recognized content obtained through training. The priority value of the visual feature of each candidate region is calculated according to the preset visual feature of the target content. The calculation unit 402 may include a first calculation unit and a second calculation unit.

The first calculation unit may first calculate a priority value of each visual feature corresponding to each preset visual feature of the target content and existing in each candidate region. In some examples, the first calculation unit may include a judging subunit and a determining subunit. The judging subunit may determine whether each visual feature in each candidate region matches each preset visual feature of corresponding target content. The determining subunit determines that a priority value of a visual feature matching the corresponding preset visual feature is equal to a preset priority value of the corresponding preset visual feature; and determines that a priority value of a visual feature failing to match the corresponding preset visual feature is equal to zero.

The second calculation unit may accumulate priority values of the visual features of each candidate region to be used as a priority value of the visual features of each candidate region.

The extraction unit 23 may extract the target content from the candidate region whose priority value of the visual features is the highest.

In some embodiments, the apparatus 80 may further include a test unit and an adjustment unit. After the extraction unit 23 extracts the target content, the test unit may test whether the extracted target content is accurate. If the extracted target content is accurate, the preset priority value of each preset visual feature of the target content remains unchanged; or if the target content is inaccurate, the adjustment unit may adjust the preset priority value of each preset visual feature of the target content. During adjustment, several other preset values may first remain unchanged and only one preset value is adjusted, to optimize a result. This is performed by analogy, and finally, each preset value is an optimal result.

Figure 9:
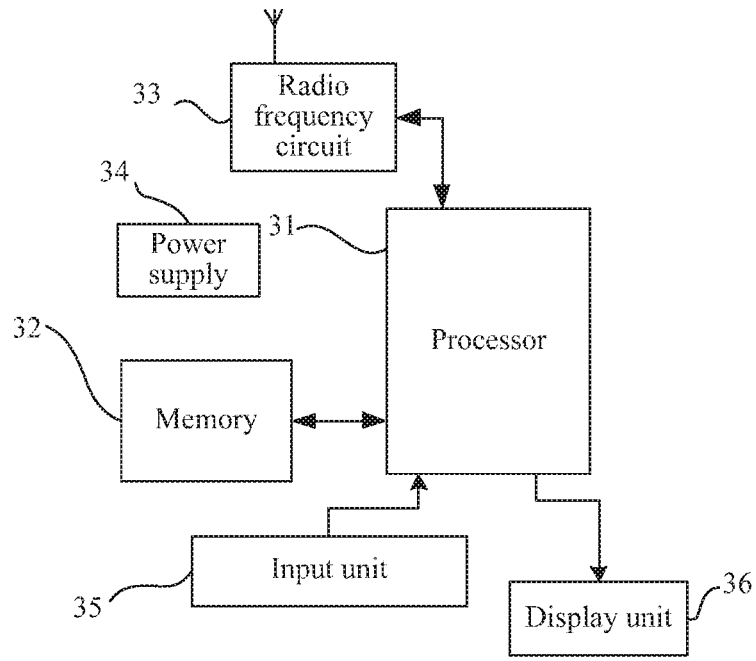
FIG. 9 is a schematic diagram of an apparatus for extracting web page content according to an embodiment of the system.

FIG. 9 is a schematic diagram of an apparatus for extracting web page content according to an embodiment of the system. The apparatus 90 may include components such as a processor 31 including one or more processing cores, a memory 32 including one or more computer readable storage media, a radio frequency (RF) circuit 33, a power supply 34, an input unit 35, and a display unit 36. A person skilled in the art may understand that the structure shown in the schematic diagram of devices in the system does not constitute a limit to the apparatus, and the apparatus may include more components or fewer components than those shown in the figure, or some components may be combined, or a different component deployment may be used.

The memory 32 may be configured to store or include the logic described herein and/or instructions executable to perform the logic. For example, the processor 31 may the logic in each embodiment by stored in the memory 32 that implement the operations of the logic. In some embodiments, the memory 32 may include a high speed random access memory, and may also include a non-volatile memory, such as at least one magnetic disk storage device, a flash memory, or another volatile solid-state storage device.

In some embodiments, a target region may be recognized by using a pre-trained machine learning algorithm to complete extraction of target content information.

Figure 10:
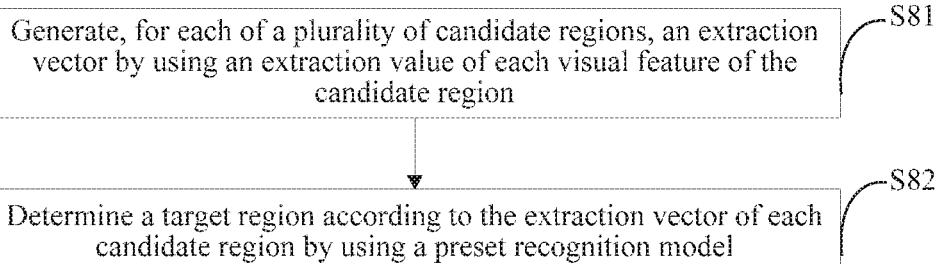
FIG. 10 is a flowchart of logic for extracting web page content according to an embodiment of the system.

FIG. 10 is a flowchart of logic for extracting web page content according to an embodiment of the system. As shown in FIG. 10, the logic 100 may include the following operations.

At operation S81, the logic may generate, for each of a plurality of candidate regions, an extraction vector by using an extraction value of each visual feature of the candidate region.

At operation S82, the logic may determine the target region according to the extraction vector of each candidate region by using a preset recognition model. The extraction vector is an array formed by organizing the extraction value of each visual feature according to a preset order. In some examples, a numeric extraction value may be directly added to the extraction value. In some other examples, the extraction value may be processed to be converted into an expression value, and then the expression value is added to the extraction value. For example, step S81 in some embodiments may include: mapping, for each visual feature of a candidate region, the extraction value of the visual feature to an expression value, the expression value corresponding, in a preset correspondence, to a preset value range within which the extraction value falls; and organizing the expression values of the visual features of the candidate region according to the preset order into the extraction vector. For example, for the numeric extraction value, different value ranges correspond to different preset values (that is, the expression values). For example, a range of 0 to 127 corresponds to 1, and a range of 128 to 255 corresponds to 2. For a non-numeric extraction value, the non-numeric extraction value may be converted into a numeric expression value by using a word vector.

Figure 11:
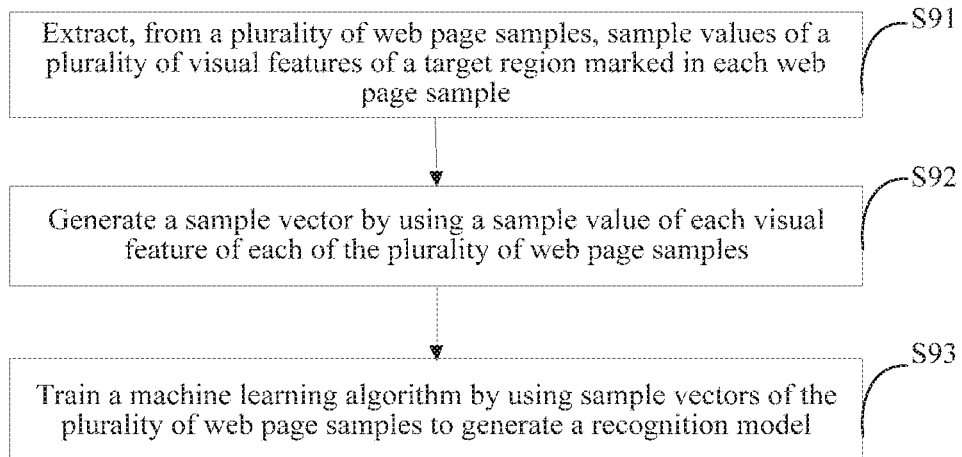
FIG. 11 is a flowchart of logic for generating a recognition model according to an embodiment of the system.

The recognition model may be obtained by training the machine learning algorithm by using a marked web page sample. FIG. 11 is a flowchart of a logic for generating a recognition model according to an embodiment of the system. As shown in FIG. 11, the logic 110 may include the following operations.

At operation S91, the logic may extract, from a plurality of web page samples, sample values of a plurality of visual features of a target region marked in each web page sample.

At operation S92, the logic may generate a sample vector by using a sample value of each visual feature of each of the plurality of web page samples.

At operation S93, the logic may train a machine learning algorithm by using sample vectors of the plurality of web page samples to generate the recognition model.

Figure 12:
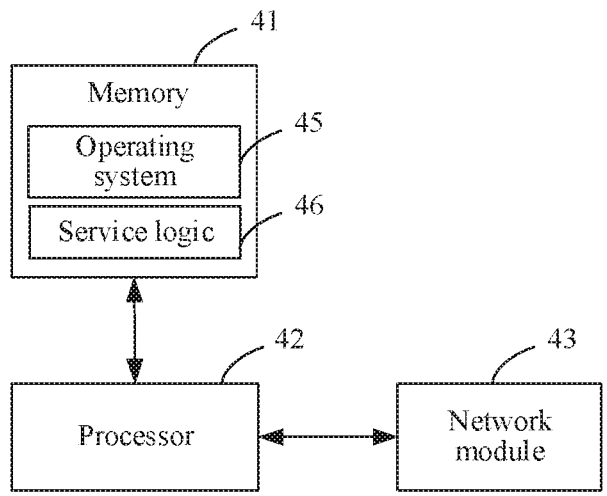
FIG. 12 is a schematic structural diagram of a server according to an embodiment of the system.

The logic for recognizing web page content provided in the embodiments of the system may be applied to a server 120 shown in FIG. 12. As shown in FIG. 12, the server 120 includes: a memory 41, a processor 42, and a network logic 43.

The memory 41 may be configured to store executable instructions and/or a logic, for example, a program instruction/logic corresponding to the method and a system for recognizing web page content in this embodiment of the system. The processor 42 executes various functional applications and data processing, that is, implements the method and system for recognizing web page content, by executing a plurality of instructions stored in the memory 41. The memory 41 may include a high-speed random memory, and may also include a nonvolatile memory such as one or more magnetic storage devices, a flash memory, or another non-volatile solid-state memory. In some examples, the memory 41 may further include memories disposed remote to the processor 42, and these memories may be connected to the server through a network. In some examples, the system may further include: an operating system 45 and a service logic 46. The operating system 45 such as LINUX, UNIX, or WINDOWS may include various components and/or drives configured to manage system tasks (for example, management of memory, control of a storage device, management of a power supply, and the like), and can communicate with various hardware components, to provide a running environment to other hardware components. The service logic 46 runs on the operating system 45, and listens to a request from a network by means of network service listening of the operating system 45, completes corresponding data processing according to the request, and returns a processing result to a terminal. That is, the service logic 46 is configured to provide a network service to the terminal.

The network logic 43 is configured to receive and send a network signal. The network signal may be a radio signal or a wired signal. In an instance, the foregoing network signal is a wired network signal.

Figure 13:
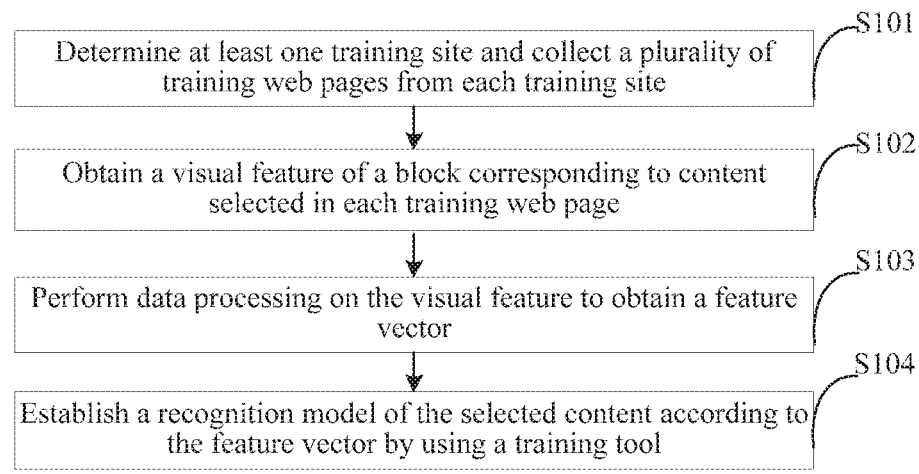
FIG. 13 is a flowchart of logic for recognizing web page content according to an embodiment of the system.

FIG. 13 is a flowchart of logic for recognizing web page content according to an embodiment of the system. This embodiment is a logic for recognizing web page content performed by a server through a network. As shown in FIG. 13, the logic 130 for recognizing web page content in this embodiment may include the following operations.

At operation S101, the logic may determine at least one training site and collect a plurality of training web pages from each training site. In some embodiments, a quantity of the training web pages collected from each training site may be, but is not limited to, determined according to prevalence of the training site. The quantity of the training web pages collected from a more popular site is larger. Therefore, a training tool can learn a visual feature corresponding to content of a web page having a large access quantity.

At operation S102, the logic may obtain a visual feature of a block corresponding to content selected in each training web page. In some embodiments, the visual feature of the block is a main feature that can express a visual level of the block of the web page. The visual feature may be, but is not limited to, a length, a width, a height of the block, a size of a font of the block, a web page label, or the like.

At operation S103, the logic may perform data processing on the visual feature to obtain a feature vector (that is, a sample vector). To obtain a feature vector recognizable to a training tool, the visual feature needs to be processed. Specifically, if the visual feature includes a numeric feature, the visual feature occupies one bit in the vector to represent the numeric feature. Specifically, value collection is performed on each numeric feature, and the values are divided into several parts, for example, 10 parts, and are mapped to 10 ranges, namely, 0 to 0.1, 0.1 to 0.2, 0.2 to 0.3, 0.3 to 0.4, 0.4 to 0.5, 0.5 to 0.6, 0.6 to 0.7, 0.7 to 0.8, 0.8 to 0.9, and 0.9 to 1.0.

If the visual feature includes a non-numeric feature, the non-numeric feature is represented in a transverse one-hot representation mode. The one-hot representation is the simplest representation manner of a word vector. That is, a word is represented by using a long vector. A length of a vector is a size of a vocabulary. Only a single "1" is in a vector component, and "0" is in all vector components. A position of "1" corresponds to a position of the word in the vocabulary.

At operation S104, the logic may establish a recognition model of the selected content according to the feature vector by using a training tool. In some embodiments, the training tool may be, but is not limited to, a gradient boosting decision tree (GBDT) training tool, or another machine training tool such as a linear regression training tool.

In some embodiments, that the establishing a recognition model of the selected content according to the feature vector is establishing a correspondence between the feature vector of the web page and web page content such as a title or a price.

The logic for recognizing web page content in the system converts a visual feature of a web page block into a feature vector that can be learned by the training tool, so that the content recognition model is generated by using the training tool, thereby improving efficiency and accuracy of recognizing web page content.

Figure 14:
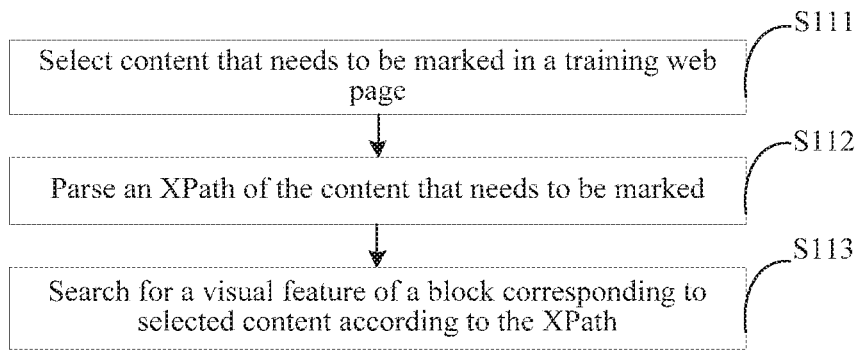
FIG. 14 is a flowchart of logic for recognizing web page content according to an embodiment of the system.
Figure 15:
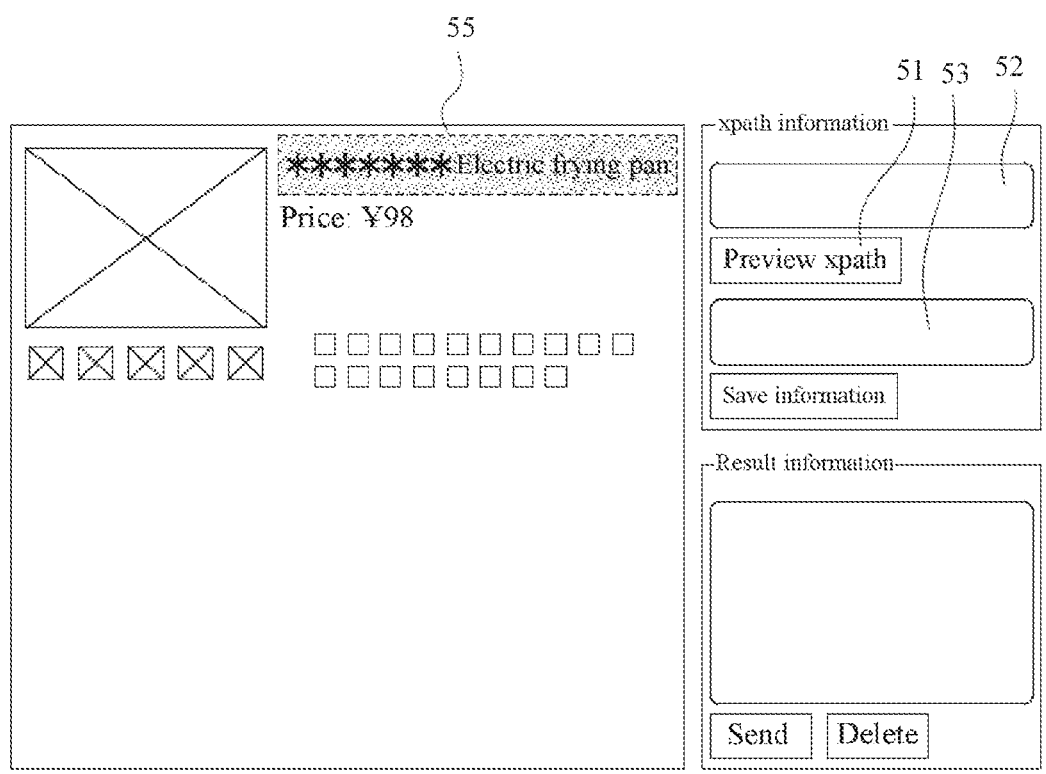
FIG. 15 is a schematic diagram of an interface of the logic for recognizing web page content in FIG. 14.

FIG. 14 is a schematic flowchart of logic for recognizing web page content according to an embodiment of the system. FIG. 15 is a schematic diagram of an interface 150 of the logic for recognizing web page content shown in FIG. 14. As shown in FIG. 14 and FIG. 15, the logic 140 for recognizing web page content 140 may include the following operations.

At operation S111, the logic may select content that needs to be marked in a training web page.

As shown in FIG. 15, in the interface 150, the content such as a title 55 that needs to be marked in the training web page can be manually selected.

At operation S112, the logic may parse an XPath of the content that needs to be marked. In some embodiments, a marking program parses an XPath of an XPath previewing button 51 when the XPath previewing button 51 receives a triggering signal, and displays the XPath in an XPath displaying region 52. Certainly, the marking program may be alternatively automatically triggered to parse the XPath of the XPath previewing button 51 and directly send the XPath to a backend.

In some embodiments, when a plurality of types of content needs to be marked, a property of the content such as a "title" needs to be input in a property input region 53, and the property of the content and the XPath of the content are correspondingly stored.

At operation S113, the logic may search for a visual feature of a block corresponding to selected content according to the XPath. In some embodiments, an XPath in each block in the web page is unique, therefore, all visual features of the corresponding block that are stored after being parsed may be found according to the XPath of the content that needs to be marked.

In some embodiments, as a core of a browser without an interface, webkit has functions of parsing a cascading style sheet (CSS) and automatically rendering an interface. Therefore, visual information of a corresponding block may be extracted by using the functions of the webkit. The visual information is then processed by using a feature engineering method to obtain and store the visual feature for searching.

The visual feature of the block corresponding to the selected content in each training web page may be obtained by using the logic 140, or the visual feature of the block corresponding to the selected content may be obtained by directly parsing the selected content such as a title that needs to be marked in the training web page.

In the logic for recognizing web page content in the system, the visual feature of the block corresponding to the selected content is obtained according to the XPath of the selected content, and a visual feature of a web page block is converted into a feature vector that can be learned by a training tool, thereby generating a content recognition model by using the training tool and further improving efficiency and accuracy of recognizing the web page content.

Figure 16:
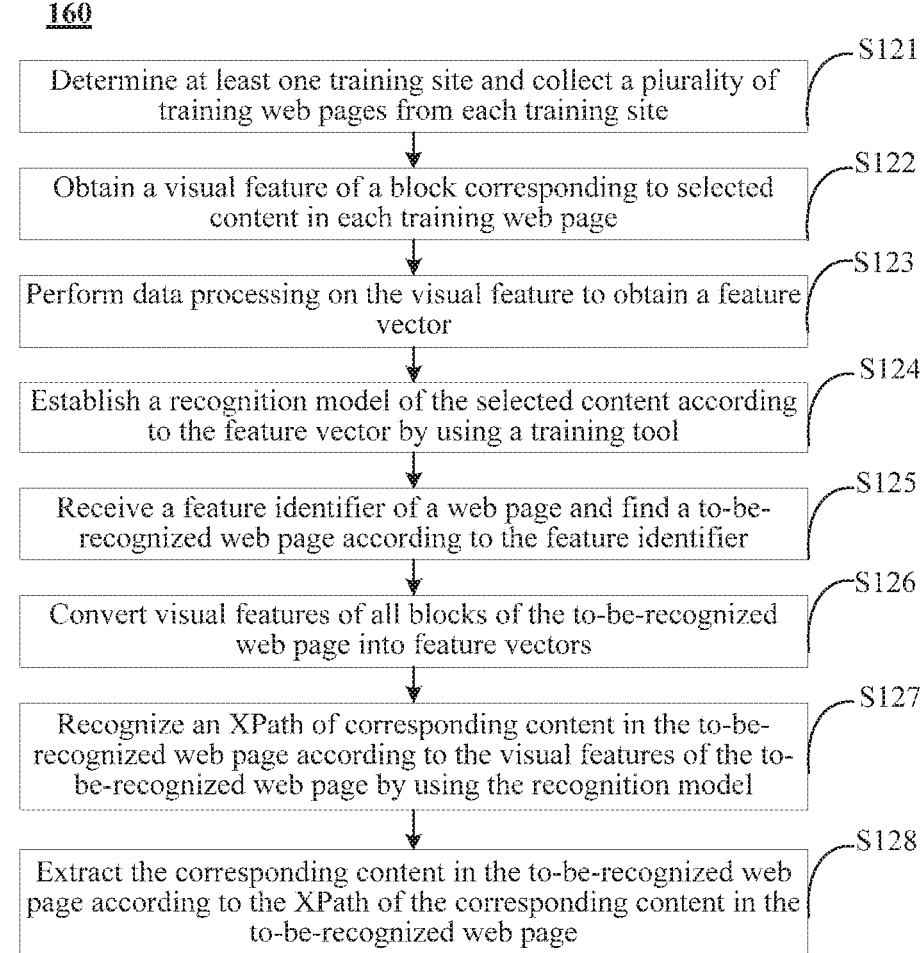
FIG. 16 is a flowchart of logic for recognizing web page content according to an embodiment of the system.

FIG. 16 is a schematic flowchart of a logic for recognizing web page content according to an embodiment of the system. This embodiment is a logic for recognizing web page content performed by a server through a network. As shown in FIG. 16, the logic 16 for recognizing web page content in this embodiment may include the following operations.

At operation S121, the logic may determine at least one training site and collect a plurality of training web pages from each training site. At operation S122, the logic may obtain a visual feature of a block corresponding to selected content in each training web page. At operation S123, the logic may perform data processing on the visual feature to obtain a feature vector. At operation S124, the logic may establish a recognition model of the selected content according to the feature vector by using a training tool.

In some embodiments, that the establishing a recognition model of the selected content according to the feature vector is establishing a correspondence between the feature vector of the web page and web page content such as a title or a price.

At operation S125, the logic may receive a feature identifier of a web page and find a to-be-recognized web page according to the feature identifier.

The feature identifier may be specifically a uniform resource locator (URL), a name, or the like, and is used for uniquely identifying a web page. In some embodiments, the feature identifier of the to-be-recognized web page may be committed to a server by a user by using a provided interaction interface, or may be committed to a server by another server, a service platform, or the like. The feature identifier of one to-be-recognized web page may be committed to the server each time, or feature identifiers of a plurality of to-be-recognized web pages may be committed to the server each time for bulk processing. The server determines, based on the feature identifier, a to-be-recognized web page on which content recognition needs to be performed.

At operation S126, the logic may convert visual features of all blocks of the to-be-recognized web page into feature vectors. At operation S127, the logic may recognize an XPath of corresponding content in the to-be-recognized web page according to the visual features of the to-be-recognized web page by using the recognition model.

In some embodiments, if the recognition model includes a plurality types of content such as a title and a relationship between a feature vector of a price and an XPath of the feature vector of the price, a property such as a "title" of corresponding content is input to recognize an XPath of the title by using the recognition model.

In some embodiments, the logic 160 for recognizing web page content may further include the following operations.

At operation S128, the logic may extract the corresponding content in the to-be-recognized web page according to the XPath of the corresponding content in the to-be-recognized web page. In some embodiments, that extracting the corresponding content in the to-be-recognized web page may be, but is not limited to, data used for collection and analysis. For example, a price trend and the like of merchandise may be detected by extracting a title and a price of the to-be-recognized web page.

In the logic for recognizing web page content in the system, the visual feature of the web page block is divided into a numeric feature and a non-numeric feature and the features are respectively converted to generate the feature vector that the training tool can learn. In this way, a content recognition model is generated by using the training tool, and content recognition is performed by using the recognition model, thereby further improving efficiency and accuracy of recognizing the web page content.

Figure 17:
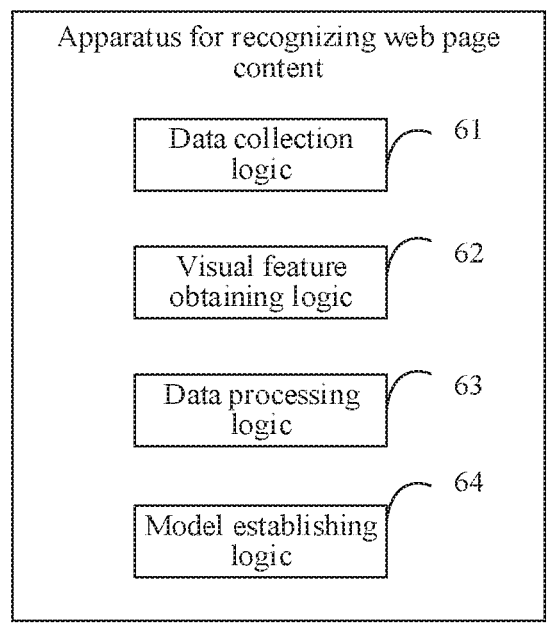
FIG. 17 is a schematic structural diagram of an apparatus for recognizing web page content according to an embodiment of the system.

FIG. 17 is a schematic structural diagram of an apparatus for recognizing web page content according to an embodiment of the system. As shown in FIG. 17, the apparatus 160 for recognizing web page content includes a data collection logic 61, a visual feature obtaining logic 62, a data processing logic 63, and a model establishing logic 64.

The data collection logic 61 may determine at least one training site and collect a plurality of training web pages from each training site. The visual feature obtaining logic 62 may obtain a visual feature corresponding to selected content in each training web page. The data processing logic 63 may perform data processing on the visual feature to obtain a feature vector. The model establishing logic 64 may establish a recognition model of the selected content according to the feature vector by using a training tool.

In some embodiments, the data collection logic 61 may determine a quantity of the training web pages collected from each training site according to prevalence of the training site.

The apparatus for recognizing web page content in the system converts a visual feature of a web page block into a feature vector that can be learned by the training tool, so that the content recognition model is generated by using the training tool, thereby performing content recognition by using the recognition model and improving efficiency and accuracy of recognizing web page content.

Figure 18:
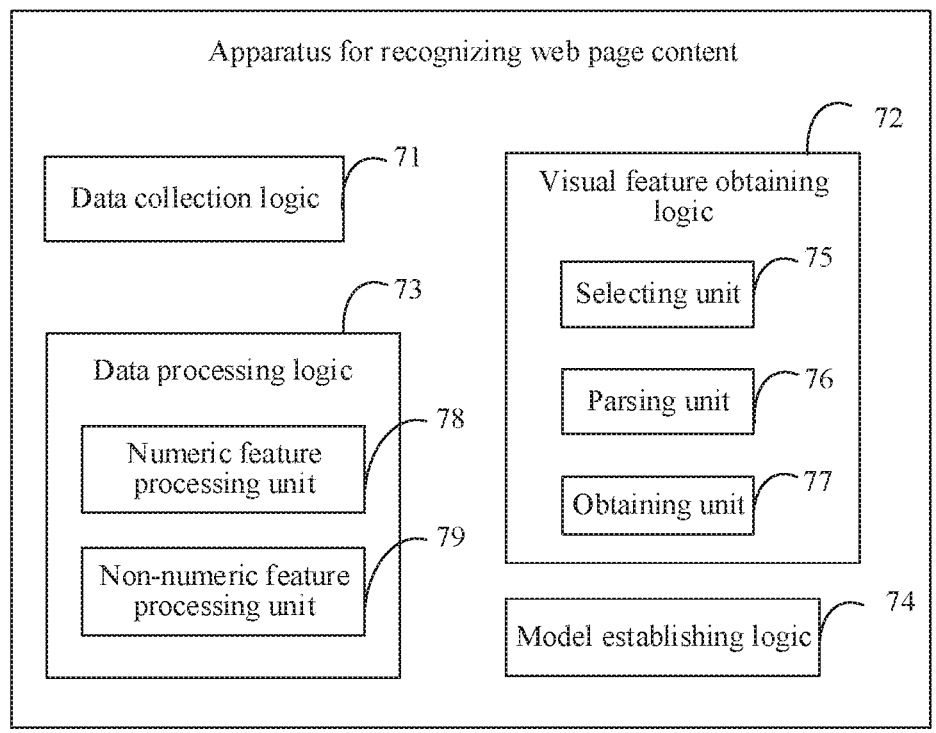
FIG. 18 is a schematic structural diagram of an apparatus for recognizing web page content according to an embodiment of the system.

FIG. 18 is a schematic structural diagram of an apparatus for recognizing web page content according to an embodiment of the system. As shown in FIG. 18, the apparatus 180 for recognizing web page content includes a data collection logic 71, a visual feature obtaining logic 72, a data processing logic 73, and a model establishing logic 74.

In some embodiments, the visual feature obtaining logic 72 includes a selecting unit 75, a parsing unit 76, and an obtaining unit 77. The selecting unit 75 may select content that needs to be marked in a training web page. The parsing unit 76 may parse an XPath of the content that needs to be marked. The obtaining unit 77 may search for a visual feature of a block corresponding to selected content according to the XPath.

In some embodiments, the data processing logic 73 includes a numeric feature processing unit 78 which may represent a numeric feature of the visual feature by occupying one bit in a vector.

In some embodiments, the data processing logic 73 includes a non-numeric feature processing unit 79 which may represent a non-numeric feature of the visual feature in a transverse one-hot representation mode.

In some embodiments, the apparatus 180 for recognizing web page content further includes a recognition logic (not shown) which is configured to receive a feature identifier of a web page, and a to-be-recognized web page is found according to the feature identifier. In addition, after visual features of all blocks of the to-be-recognized web page are converted into feature vector, an XPath of corresponding content in the to-be-recognized web page is recognized according to the visual features of the to-be-recognized web page by using the recognition model.

In the apparatus for recognizing web page content in the system, the visual feature of the web page block is divided into a numeric feature and a non-numeric feature and the features are respectively converted to generate the feature vector that the training tool can learn. In this way, a content recognition model is generated by using the training tool, and content recognition is performed by using the recognition model, thereby further improving efficiency and accuracy of recognizing the web page content.

Figure 19:
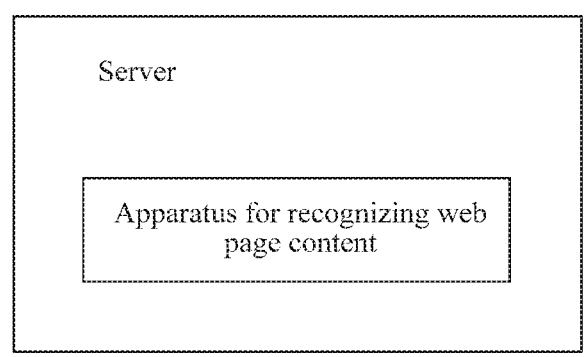
FIG. 19 is a schematic structural diagram of a server according to an embodiment of the system.

FIG. 19 is a schematic structural diagram of a server according to an embodiment of the system. As shown in FIG. 19, the server 190 includes an apparatus for recognizing web page content. The apparatus for recognizing web page content may be the apparatus for recognizing web page content in the embodiments in the system, for example, the apparatuses 11, 80, 90, 120, 160,180, and the like for recognizing web page content The method and apparatus for recognizing web page content, and the server in the system converts a visual feature of a web page block into a feature vector that can be learned by a training tool, so that a content recognition model is generated by using the training tool, thereby improving efficiency and accuracy of recognizing web page content.

It should be noted that, all operations and logic in the foregoing procedures and structural diagrams are not necessary, some steps or logic may be neglected according to actual needs. An execution order of the steps is not fixed, and may be adjusted as needed. Division of the logic is merely functional division for ease of description. During actual implementation, one logic may be implemented separately by multiple logic, and functions of multiple logic may also be implemented by one same logic. The logic may be located in a same device, and may also be located in different devices. In addition, "first" and "second" used in the foregoing description are merely used for conveniently distinguishing two objects having a same meaning, and do not indicate that the two objects have a substantial difference.

In general, each embodiment, hardware may be implemented by hardware of dedicated hardware or hardware executing the machine-readable instruction. For example, the hardware may be a specifically designed permanent circuit or logical device (for example, a dedicated processor, such as an FPGA or an ASIC) for completing a specific operation. The hardware may also include a programmable logical device or circuit (for example, including a general processor or another programmable processor) configured to perform a specific operations.

The machine-readable instruction corresponding to a logic in the figure may enable an operating system and the like operated on a computer to complete some or all operations described herein. A non-volatile computer-readable storage medium may be a memory disposed in an expansion board inserted in the computer or a memory disposed in an expansion unit connected to the computer. A CPU or the like installed on the expansion board or the expansion unit may perform some and all actual operations according to an instruction.

Persons of ordinary skill in the art may understand that the systems, apparatus, devices, and logic described herein may include a processor may in communication with memory. Examples of the processor may include a general processor, a central processing unit, a microcontroller, a server, an application specific integrated circuit (ASIC), a digital signal processor, a field programmable gate array (FPGA), and/or a digital circuit, analog circuit, or some combination thereof. The processor may be one or more devices operable to execute logic. The logic may include computer executable instructions or computer code stored in the memory or in other memory that when executed by the processor, cause the processor to perform the features implemented by the logic of units, subunits, and/or logic described herein. The computer code may include instructions executable with the processor.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device. In some examples, the memory may include a non-transitory computer-readable storage medium includes a floppy disk, a hard disk, a magneto-optical disk, an optical memory (such as a CD-ROM, a CD-R, a CD-RW, a DVD-ROM, a DVD-RAM, a DVD-RW, or a DVD+RW), a magnetic tape, a non-volatile storage card, and a ROM. Optionally, program code may be downloaded form a server computer through a communications network.

In some examples, the memory may include at least one the units, subunits, or logic, and/or logic described herein. In addition, the memory may include any other component previously discussed and/or other components described herein.

In some examples, the units, subunits, and/or logic described herein may be referred to as a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method for extracting web page content, the method comprising:
   determining, by a processor, a plurality of candidate regions in a web page, each candidate region comprising one or more page elements at neighboring positions in the web page;
   extracting, by the processor, for each of the plurality of candidate regions, extraction values corresponding to a plurality of visual features in the candidate regions, the visual features included in a plurality of web page samples, the visual features being perceptible to human eyes, and the extraction values derived from attribute values respectively defined by the web page for the visual features;
   extracting, by the processor, from the web page samples, respective sample values for the visual features in response to the visual features being included in respective sample target regions marked in the web page samples;
   determining, by the processor, respective value ranges for the visual features based on the sample values;
   generating, by the processor, an extraction criteria based on the respective value ranges;
   selecting, by the processor, from the plurality of candidate regions, a target region that satisfies the extraction criteria based on the extraction values corresponding to the visual features; and
   extracting content information from the target region.

2. The method according to claim 1, wherein the selecting, by the processor, from the plurality of candidate regions, the target region that satisfies the extraction criteria based on the extraction values corresponding to the visual features further comprises:
   calculating, by the processor, respective priority values for the visual features based on the extraction values and the respective value ranges of the visual features that are included in the extraction criteria;
   determining, by the processor, respective priority value sums for the candidate regions, each of the respective priority value sums comprising a sum of the respective priority values for the visual features located in each corresponding one of the candidate regions; and
   selecting, by the processor, from the plurality of candidate regions, the target region in response to a priority value sum of the target region being a greatest one of the respective priority value sums for the candidate regions.

3. The method according to claim 1, further comprising:
   determining, by the processor, respective weights for the visual features based on a plurality of second web page samples and the respective value ranges of the visual features; and
   calculating, by the processor, the respective priority values for the visual features based on the extraction values and the respective value ranges of the visual features that are identified by the extraction criteria further comprises:
   setting, by the processor, for a first visual feature of a first candidate region in the plurality of candidate regions, a priority value of the first visual feature as a weight of the first visual feature in response to an extraction value of the first visual feature of the candidate region being within a value range of the first visual feature in the extraction criteria.

4. The method according to claim 1, wherein the selecting, by the processor, from the plurality of candidate regions, the target region that satisfies the extraction criteria based on the extraction values corresponding to the visual features further comprises:
   generating, by the processor, respective extraction vectors for the candidate regions based on the extraction values; and
   determining, by the processor, the target region based on a preset recognition model and the respective extraction vectors for the candidate regions.

5. The method according to claim 4, further comprising:
   extracting, by the processor, from a plurality of web page samples, sample values for a plurality of sample visual features included in respective sample target regions marked in the web page samples;

generating, by the processor, sample vectors based on at least one of the sample values; and training, by the processor, a recognition model based on the sample vectors of the plurality of web page samples.

6. The method according to claim 4, wherein generating, by the processor, respective extraction vectors for the candidate regions based on the extraction values further comprises:

mapping, by the processor, an extraction value corresponding to at least one of the visual features in a candidate region to an expression value, the expression value associated with a preset value range, wherein the extraction value is within the preset value range; and prioritizing, by the processor, a plurality of expression values corresponding to the visual features of the candidate region into an extraction vector based on a preset order.

7. The method according to claim 1, wherein determining, by the processor, a plurality of candidate regions in a web page further comprises:

determining, by the processor, a plurality of regions located in a position range in the web page as the plurality of candidate regions.

8. The method according to claim 7, further comprising:

determining, by the processor, the position range based on respective positions of target regions marked in a plurality of web page samples.

9. The method according to claim 1, wherein determining, by the processor, a plurality of candidate regions in a web page further comprises:

determining, by the processor, a plurality of regions comprising a preset content tag in the web page as the plurality of candidate regions.

10. A system comprising:

a processor and a non-transitory computer-readable storage medium, the non-transitory computer-readable storage medium comprising a plurality of instructions configured to cause the processor to:

determine a plurality of candidate regions in a web page, each candidate region comprising one or more page elements at neighboring positions in the web page;

extract, for each of the plurality of candidate regions, extraction values corresponding to a plurality of visual features in the candidate regions, the visual features being perceptible to human eyes, and the extraction values derived from attribute values respectively defined by the web page for the visual features;

generate respective extraction vectors for the candidate regions based on the extraction values;

select, from the plurality of candidate regions, a target region that satisfies an extraction criteria based on the extraction values corresponding to the visual features, and further based on a preset recognition model and the respective extraction vectors for the candidate regions; and extract content information from the target region.

11. The system of claim 10, further wherein the instructions further cause the processor to:

extract, from a plurality of web page samples, sample values for a plurality of sample visual features included in respective sample target regions marked in the web page samples;

generate sample vectors based on at least one of the sample values; and train a recognition model based on the sample vectors of the plurality of web page samples.

12. The system of claim 10, wherein to generate respective extraction vectors for the candidate regions based on the extraction values, the instructions further cause the processor to:

map an extraction value corresponding to at least one of the visual features in a candidate region to an expression value, the expression value associated with a preset value range, wherein the extraction value is within the preset value range; and prioritize a plurality of expression values corresponding to the visual features of the candidate region into an extraction vector based on a preset order.

13. The system of claim 10, wherein to determine a plurality of candidate regions in a web page, the instructions further cause the processor to:

determine a plurality of regions located in a position range in the web page as the plurality of candidate regions.

14. The system of claim 13, wherein the instructions further cause the processor to:

determine the position range based on respective positions of target regions marked with a preset content tag in a plurality of web page samples.

15. A non-transitory computer readable storage medium comprising:

a plurality of instructions executable by a processor and cause the processor to:

determine a position range in a web page based on respective positions of target regions marked in a preset content tag in a plurality of web page samples;

determine a plurality of regions in the position range as a plurality of candidate regions in the web page, each candidate region comprising one or more page elements at neighboring positions in the web page;

extract, for each of the plurality of candidate regions, extraction values corresponding to a plurality of visual features in the candidate regions, the visual features being perceptible to human eyes, and the extraction values derived from attribute values respectively defined by the web page for the visual features;

select, from the plurality of candidate regions, a target region that satisfies an extraction criteria based on the extraction values corresponding to the visual features; and extract content information from the target region.

* * * * *